United States Patent [19]

Fuchigami

[11] 4,233,178
[45] Nov. 11, 1980

[54] MICRO-CAPSULES AND METHOD FOR THEIR PRODUCTION

[75] Inventor: Mitsuru Fuchigami, Takasago, Japan

[73] Assignee: Mitsubishi Paper Mills, Ltd., Tokyo, Japan

[21] Appl. No.: 946,376

[22] Filed: Sep. 27, 1978

[30] Foreign Application Priority Data

Sep. 28, 1977 [JP] Japan .................. 52-116249

[51] Int. Cl.³ ........................... B01J 13/02
[52] U.S. Cl. ................... 252/316; 428/307; 428/914
[58] Field of Search .................. 252/316; 424/32

[56] References Cited

U.S. PATENT DOCUMENTS

| | | | |
|---|---|---|---|
| 3,069,370 | 12/1962 | Jensen et al. | 252/316 X |
| 3,594,328 | 7/1971 | Schibler | 252/316 |
| 4,100,103 | 7/1978 | Foris et al. | 252/316 |

FOREIGN PATENT DOCUMENTS

| | | | |
|---|---|---|---|
| 53-84881 | 7/1978 | Japan | 252/316 |
| 1091078 | 11/1967 | United Kingdom | 252/316 |

*Primary Examiner*—Richard D. Lovering
*Attorney, Agent, or Firm*—Cushman, Darby & Cushman

[57] ABSTRACT

A hydrophobic material such as an oil solution of a dye is dispersed by the aid of a styrene-maleic anhydride copolymer to form an aqueous dispersion, then a melamine-formaldehyde precondensate is added into said dispersion and the mixture is heated and hardened to produce micro-capsules. These micro-capsules are proof against leakage or oozing of the hydrophobic material and uniform in shape and can serve excellently, for example, as dye capsules used for non-carbon paper.

8 Claims, 1 Drawing Figure

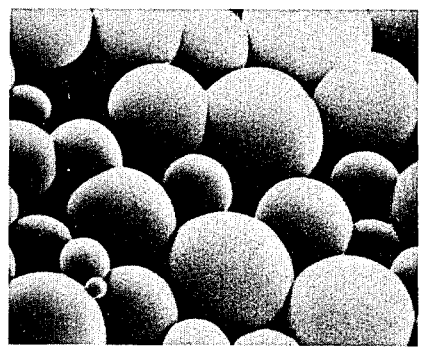
X 5000

MICRO-CAPSULES AND METHOD FOR THEIR PRODUCTION

This invention relates to micro-capsules which are useful for retaining a per se unstable substance such as a reactive or liquid substance in a stable state.

A variety of methods including the popularly used physical method, coacervation method, interfacial polymerization method and in-situ method are known for the production of micro-capsules.

The products according to the physical method are suited for certain uses such as dragees but quite inferior in retention of the encapsulated material because of imperfect capsule film.

The coacervation method is widely used and the products therefrom are advantageously used for encapsulation of such materials as dyes for no-carbon copying paper, adhesives, liquid crystals, etc. Usually, gelatin and at least one anionic material selected from gum arabic, sodium alginate, styrene-maleic anhydride copolymers, vinyl methyl ether-maleic anhydride copolymers, phthalic acid esters of starch, polyacrylic acid and the like are used. The essential defects of this method are that, because of use of gelation, the products are costly, poor in water resistance, vulnerable to the attack of the microorganisms and hard to make a high-concentration capsule emulsion. Also, a complicated process is required for the production of capsules. The interfacial polymerization method is characterized by forming such material as polyamide, epoxy resin, polyurethane, polyurea or the like at the interface between the hydrophobic liquid and water and is capable of producing the capsules with excellent contents-retainability depending on the material of capsule. This method, however, involves difficulties in controlling the reactions in the process as it uses a highly reactive or strongly poisonous material such as an acid chloride, isocyanate, epoxy compound or the like. This method also has the drawbacks that the capsules obtained therefrom can not contain certain types of substance such as a composition including active hydrogen, and that the materials used in this method are rather expensive.

The in-situ method utilizing an aminoplast (amino resin) wall material is also practically applied in the industry, and many patent applications have been filed in relation to this method (such as Japanese Patent Publication Nos. 12380/62, 12381/62, 3495/69, 14379/69, 30282/71, 10780/72 and 23165/72).

This method has the advantages that an inexpensive urea-formaldehyde resin can be used and that the capsules with strong resistance to water and microorganisms are obtained, but according to this method, sufficient denseness may not be provided to the capsule wall surrounding a hydrophobic material, resulting in inability to effect sufficient emulsification or dispersion of such material.

As an improvement of this method, use of an ethylene-maleic anhydride copolymer, methyl vinyl ether-maleic anhydride copolymer, polyacrylic acid or the like as modifier or emulsifier has been proposed (Japanese Patent Kokai (Laid-Open) No. 9079/76).

The present invention relates to the micro-capsules using a melamine-formaldehyde resin as wall material.

Melamine-formaldehyde resin, as compared with urea-formaldehyde resin, is higher in curing speed, tensile strength, compressive strength, heat resistance and deformation temperature, lower in water absorption and stronger in resistance to weak acid or alkali, but heretofore, urea-formaldehyde resin has been prevalently used for production of capsules and little use has been made of melamine-formaldehyde resin. Only recently, use of the latter as a modifier of urea-formaldehyde resin has been proposed (Japanese Patent Kokai (Laid-Open) No. 66878/77).

In the past, encapsulation by use of melamine-formaldehyde resin has been suggested in the art as for instance mentioned in Japanese Patent Publication Nos. 12380/62 and 12518/63, but no detailed account has been made of such capsulation method and hence practice of the process suggested in such patents would not lead to production of good capsules.

In such circumstances, the present invention is intended to provide the amazingly improved melamine-formaldehyde resin made micro-capsules by using a styrene-maleic anhydride copolymer as adjuvant material.

Melamine is sparingly soluble in water, but in view of the fact that agglomerates are obtained when a small quantity of melamine is dissolved in water and added into an aqueous solution of said maleic anhydride copolymer, it is considered that the reaction takes place to a certain degree in such mixture.

The micro-capsules of this invention are produced from a process which comprises the following three steps:

(1) A hydrophobic material is emulsified in an aqueous solution of a maleic anhydride copolymer (step in an acidic state).

(2) A precondensate of melamine and formaldehyde is prepared (step in an alkaline state).

(3) The emulsified version of the hydrophobic material is made into capsules while producing the melamine-formaldehyde resin in an acid state.

In the first step, a hydrophobic material (which may be a solution) is dispersed or emulsified with an acid aqueous solution of a styrene-maleic anhydride copolymer. The pH of the solution at the time of emulsification may be of any value provided that it is not higher than 7. The styrene-maleic anhydride copolymers are an excellent dispersant or emulsifier. Such copolymer is used in an amount of about 2 to 20 parts for 100 parts of the hydrophobic material. If the phenomenon of dispersion or emulsification alone is considered, use of a greater amount of said copolymer leads to a better result, but actually, there is a certain limitation to the blendable amount of the copolymer, and such amount is determined depending on the required solids concentration in the product, desired particle size distribution, viscosity, price and other factors.

The second step is devoted to preparation of a precondensate of melamine and formaldehyde. Any usual method may be employed for easily making such precondensate, but the melamine to formaldehyde ratio is an important consideration in this step, that is, it is essential that the molar ratio of melamine: formaldehyde is 1:1.5 or higher. When the amount of formaldehyde is less than the above-defined value, no satisfactory capsule is produced. The preferred range of said ratio is from 1:2 to 1:3 or even up to 1:3.89. If said ratio is within this range, melamine is easily dissolved in a short time (15 to 30 minutes) by heating (about 50° C. or higher) in an alkaline condition (pH about 8 to 10) to produce a desired precondensate. The term "precondensate" used herein refers to a melamine-formaldehyde condensate which is soluble in water. The thus obtained precondensate may vary in the degree of methylolation ranging from monomethylolmelamine to hexamethylolmelamine and may be mixed with formaldehyde. It is of course possible to use a commercial melamine resin precondensate if any suitable type is available.

In the third step, the emulsion prepared in the first step and the melamine-formaldehyde precondensate formed in the second step are mixed and heated to harden the melamine-formaldehyde resin precondensate to thereby produce the capsules. Heating in this step is conducted at a temperature of higher than 50° C., preferably 60° to 80° C. The rate of capsule formation varies depending on the temperature and pH of the solution, but usually the satisfactory capsules are produced within one hour. The pH contemplated here is that of the mixture of said emulsion and precondensate. The pH value employable in this step is within the range of 3.5 to 7, preferably 4.0 to 6.5. The amount of the melamine-formaldehyde precondensate added may be suitably selected from within the range of 50 to 500 weight parts per 100 weight parts of the styrene-maleic anhydride copolymer.

Confirmation of the formation of the desired capsules can be made by once drying the products and then again dispersing them in water. The degree of encapsulation can be easily determined by micro-scopically observing the conditions of the formed capsules before and after drying. In the case of the incomplete or defective capsules, the hydrophobic material separates after drying. After confirming the formation of the capsules, the temperature is lowered to room temperature and pH is adjusted to the value allowed at use (normally close to neutral), thereby completing the capsulization.

The hydrophobic material used in this invention may be either liquid or solid at normal temperature.

Described below by way of an embodiment is the production of the capsules for no-carbon copying paper for facilitating understanding of the principle of this invention, but the capsules for other uses can be similarly produced.

The drawing is the magnified microphotograph of the capsules produced according to the method of this invention, and in the drawing:

FIGURE is a scanning electron microscopic photograph (5,000 magnifications) of the micro-capsules produced in Example 1 of this invention.

EXAMPLE 1

A hydrophobic material was prepared by dissolving under heating 2 gr of crystal violet lactone (CVL) and 1 gr of benzoyl leucomethylene blue (BLMB) in 100 gr of KMC-113 (commercial name for an oil product—an aromatic hydrocarbon solvent mainly composed of diisopropylnaphthalene, b.p. 250°-350° C. - by Kureha Chemicals), and this hydrophobic material (an oil solution of dye) was emulsified in 100 gr of a 5% aqueous solution (pH 4.0) of Scripset 520 (a styrene-maleic anhydride (1:1 by mole) copolymer by Monsanto) having dissolved therein a small quantity of sodium hydroxide. Then, a mixture composed of 10 gr of melamine, 25 gr of 37% formaldehyde and 65 gr of water was rendered into pH 9 with sodium hydroxide and heated to 60° C., whereby the solution became transparent in 15 minutes and a melamine-formaldehyde precondensate was obtained. To this precondensate was added the said emulsion, and after adjusting the solution temperature to 60° C., the mixture was agitated. Formation of the capsules was confirmed in 30 minutes, so that products were cooled down to room temperature. The thus obtained micro-capsules could be excellently applied to no-carbon copying paper. (See the photograph of FIGURE).

Comparative Example 1 (Micro-capsules produced according to a known method)

100 gr of the same hydrophobic material as used in Example 1 (an oil solution of dye) was emulsified in 100 gr of a 5% aqueous solution (pH 4.0) of EMA-31 (copolyethylene-maleic anhydride, M.W.=80,000, by Monsanto), and this emulsion was added into a solution prepared by dissolving 10 gr of urea, 1 gr of resorcin and 25 of formaldehyde in 100 gr of water. The system temperature was adjusted to 60° C. As formation of capsules was scarcely noticed in one and half hours, the reaction was further continued for 3 hours and the temperature was lowered to room temperature.

Comparative Example 2 (Micro-capsules according to another known method)

100 gr of the same hydrophobic material as used in Example was emulsified in 100 gr of a 5% aqueous solution (adjusted to pH 4.0) of a gelatin (YGL by Miyagi Chemicals, isoelectric point: 5.2), and to this emulsion was added a melamine-formaldehyde precondensate obtained by heating a pH 9.0 mixutre of 10 gr of melamine, 25 gr of 37% formaldehyde and 65 gr of water for 30 minutes, and the mixture was agitated at 60° C. for 3 hours and then the temperature was lowered to room temperature.

The above-said three kinds of micro-capsules were coated respectively on the surface of commercial no-carbon copying paper base (using phenol resin as acidic material) at the rate of approximately 5 g/m² (on dry basis), and then each thus treated surface was dried at 105° C. The results were as described below.

Example 1

Pure white paper was obtained (whiteness degree: 80.5). No noticeable change was noted after heating at 140° C. for 3 hours.

Comparative Example 1

There was obtained paper slightly tinted in blue overall and having blue points at places (whiteness degree: 77.0). 3 hour heating at 140° C. turned this paper into a fairly thickly blue-colored paper.

Comparative Example 2

There was produced entirely blue paper (whiteness degree: below 60), and no good capsules were obtained.

These results show that the capsules of Example 1 alone cause no leakage or oozing of the inner phase (core material) of the capsules and are excellent capsules in all aspects.

Comparative Example 3

10 gr of melamine, 25 gr of 37% formaldehyde and 65 gr of water were mixed and, after adjusting pH to 10.0, the mixture was reacted at 60° C. for 30 minutes to obtain a transparent melamine-formaldehyde precondensate. Then 100 gr of a hydrophobic oil was added thereto and the mixture was agitated and emulsified. The oil phase left slightly on the surface and even the reverse phase (W/O) was seen partly, and no good emulsion could be obtained. A microscopic observation showed precipitation of the melamine-formaldehyde resin without encapsulation of oil, and the products could not be regarded as capsules.

Coating a commercial no-carbon paper with this suspension, there was merely obtained a blue paper. When the suspension was left as it was, a part of the oil phase was seen separated in the upper portion.

What is claimed is:

1. A method of producing micro-capsules containing a hydrophobic material comprising the steps of dispersing the hydrophobic material in an acidic aqueous solution of a styrene-maleic anhydride copolymer as dispersing agent or emulsifier for said hydrophobic material, adding to the dispersion a melamine-formaldehyde precondensate, and heating the mixture in a acidic state to harden the melamine-formaldehyde precondensate to form the wall of the microcapsule.

2. A method according to claim 1, wherein the amount of the styrene-maleic anhydride copolymer is 2 to 20 weight parts per 100 weight parts of the hydrophobic material.

3. A method according to claim 2 wherein the amount of the melamine-formaldehyde precondensate is 50 to 500 weight parts per 100 weight parts of the styrene-maleic anhydride copolymer.

4. A method according to claim 1, wherein the amount of the melamine-formaldehyde precondensate is 50 to 500 weight parts per 100 weight parts of the styrene-maleic anhydride copolymer.

5. A method according to claim 1, wherein the melamine-formaldehyde precondensate has been produced by reacting melamine with formaldehyde in the proportion of 1:2–1:3.

6. A method according to claim 1 wherein the melamine-formaldehyde precondensate has been produced by reacting melamine with formaldehyde in the proportion of 1: at least 1.5.

7. A method according to claim 6 wherein the melamine is reacted with formaldehyde in the ratio of 1:2 to 1:3.89.

8. Micro-capsules containing the hydrophobic material produced according to the method of claim 1.

* * * * *